United States Patent [19]

Payne

[11] Patent Number: 4,890,673

[45] Date of Patent: Jan. 2, 1990

[54] METHOD OF REMOVING VOLATILE CONTAMINANTS FROM CONTAMINATED EARTH STRATA

[75] Inventor: Frederick C. Payne, Charlotte, Mich.

[73] Assignee: Midwest Water Resource, Inc., Charlotte, Mich.

[21] Appl. No.: 151,065

[22] Filed: Feb. 1, 1988

Related U.S. Application Data

[63] Continuation-in-part of Ser. No. 22,105, Mar. 4, 1987, Pat. No. 4,730,672.

[51] Int. Cl.⁴ .............................................. E21B 43/40
[52] U.S. Cl. ..................................... 166/266; 166/267; 210/901
[58] Field of Search ................. 166/369, 370, 265–268, 166/278; 210/901, 194; 405/128, 129; 55/256, 268, 316; 422/88

[56] References Cited

U.S. PATENT DOCUMENTS

| | | | |
|---|---|---|---|
| 813,671 | 2/1906 | Schlatter et al. | 422/88 |
| 2,373,112 | 4/1945 | Francis | 422/88 |
| 4,026,355 | 5/1977 | Johnson et al. | 166/246 |
| 4,167,973 | 9/1979 | Forte et al. | 166/267 |
| 4,183,407 | 1/1980 | Knopik | 166/370 |
| 4,303,127 | 12/1981 | Freel et al. | 166/267 X |
| 4,323,122 | 4/1982 | Knopik | 166/267 |
| 4,442,901 | 4/1984 | Zison | 166/50 X |
| 4,469,176 | 9/1984 | Zison et al. | 166/369 X |
| 4,487,054 | 12/1984 | Zison | 166/369 X |
| 4,593,760 | 6/1986 | Visser et al. | 166/267 |
| 4,660,639 | 4/1987 | Visser et al. | 166/267 |
| 4,730,672 | 3/1988 | Payne | 166/266 |

Primary Examiner—Bruce M. Kisliuk
Attorney, Agent, or Firm—Thomas J. Dodd

[57] ABSTRACT

A method and apparatus of collecting volatile contaminants from a contaminated layer of earth. The apparatus is a closed-loop device which includes one or more contaminant withdrawal wells surrounded by multiple air reinjection wells connected by a conduit. One or more pumps serve to draw volatilized contaminant through the withdrawal well to the connecting conduit where it is captured or neutralized. Residual air from the withdrawal well is urged back into the ground through the air reinjection wells to encourage further contaminant to move toward the withdrawal well for collection.

11 Claims, 5 Drawing Sheets

METHOD OF REMOVING VOLATILE CONTAMINANTS FROM CONTAMINATED EARTH STRATA

CROSS-REFERENCE TO RELATED APPLICATIONS

This application is a continuation-in-part of my co-pending application, Ser. No. 022,105, Filed Mar. 4, 1987, which is now U.S. Pat. No. 4,730,672, issued Mar. 15, 1988.

FIELD OF THE INVENTION

This invention relates to an improved method of removing volatile contaminants from permeable earth strata both above and below the water table and to apparatus for effecting the method which also captures or neutralizes the contaminants for effective disposal.

BACKGROUND OF THE INVENTION

Soil and water contamination due to spillage of volatile chemicals has long posed a serious problem in the obtainment of clean drinking and irrigation water. Initial studies in the contaminant removal area were conducted near landfill sites where migration of methane through the soil caused water and soil contamination in adjacent areas. The results of these studies may be found in various trade publications, referenced in my U.S. Pat. No. 4,730,672, issued Mar. 15, 1988.

There are several methods which have previously been used to remove industrial pollutants from contaminated earth strata both above the water table (vadose zone) and below the water table. The most common of these methods is excavation in which all of the contaminated soil is removed and eventually replaced with fresh earth. While excavation is a relatively simple process, it is not practical when large volumes are involved due to prohibitive cost and time factors.

Another method involves a circulation system for leaching contaminants from the vadose layer into the water table where they are recovered by a water removal well and a pump. This process is shown generally in U.S. Pat. No. 4,167,973 as well as other patents. Such processes are not always successful due to low water solubility of most common industrial pollutants, which results in lengthy and often costly recovery.

A third method involves the creation of a vacuum within a withdrawal well in the vadose zone. By injecting air into the soil at points surrounding the withdrawal well, contaminants are urged towards the withdrawal well where they are vaporized and collected by vacuum withdrawal. Such method is described in U.S. Pat. No. 4,183,407 and 4,593,760. These methods are generally effective in contaminant recovery but do not provide for satisfactory disposal of most contaminants.

SUMMARY OF THE INVENTION

The method and apparatus of this invention utilizes the principles of vacuum vaporization and extraction of contaminants from the vadose layer. The method involves drilling one or more contaminant withdrawal wells into a layer of earth where contaminants are present. A plurality of air injection wells are drilled spaced from the central withdrawal well. Impermeable conduit is introduced into each well which is then backfilled. All conduits are connected for continued air flow and a neutralizing element placed between the withdrawal well conduit and the connecting conduits to provide clean air flow to all air injection wells and facilitate contaminant recovery.

An equilibration chamber may also be connected to the contaminant recovery line and allows samples to be taken which confirm system efficiency during operation without the need for shutdown. It is understood that the withdrawal wells may be placed in any layer of permeable strata which contains contaminants, either above, in, or below the water table.

Accordingly, it is an object of this invention to provide a novel method and apparatus for recovery of volatile contaminants from contaminated earth strata.

Another object of this invention is to provide for a closed loop vacuum apparatus which efficiently draws vaporized contaminants from contaminated earth strata and which neutralizes the contaminants and recirculates clean air back to the earth.

Another object of this invention is to provide for a soil contaminant recovery method which is economical.

Still another object of this invention is to provide for a soil contaminant recovery method which complies with regulatory agency requirements and which allows quantitative testing to be performed during system operation to assure system efficiency.

Other objects of this invention will be readily apparent upon a reading of the following description.

DESCRIPTION OF THE PREFERRED EMBODIMENTS

The preferred methods and apparati herein described are not intended to be exhaustive or to limit the invention to the precise forms disclosed. They are chosen and described to explain the principles of the invention, and the application of the method to practical uses, so that others skilled in the art may practice the invention.

Figure 2:
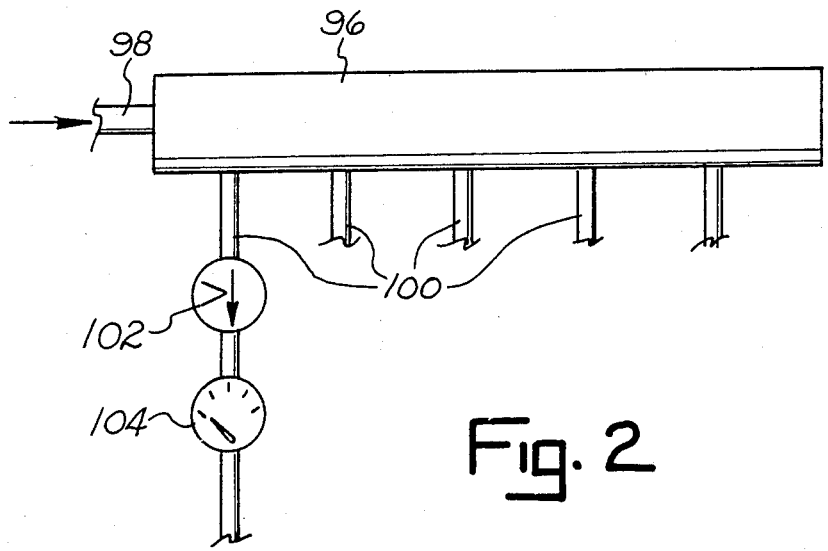
FIG. 2 is an elevational view of the manifold used at the air injection wells.
Figure 3:
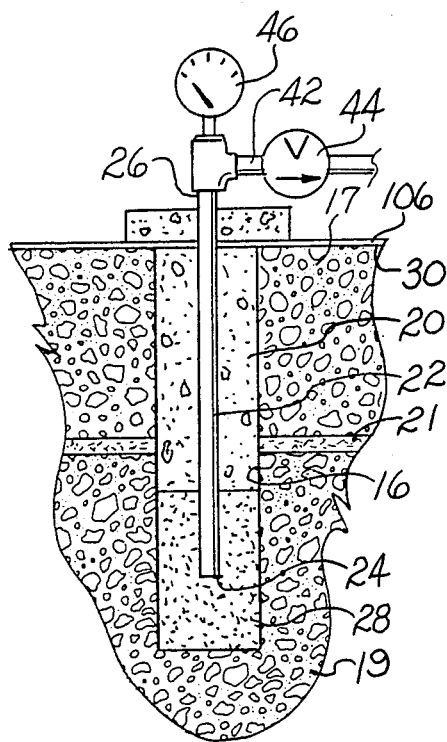
FIG. 3 is a fragmentary cross-sectional view of a vacuum withdrawal well of FIG. 1.
Figure 4:
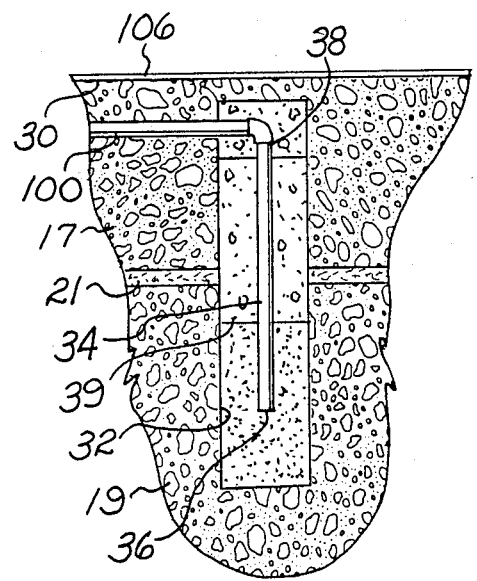
FIG. 4 is a fragmentary cross-sectional view of an air injection well of FIG. 1.

The preferred method herein described may be best understood by following the description of the apparatus designated generally by the numeral 10 in the drawings. Apparatus 10 includes a withdrawal well 12 which is surrounded by a plurality of air injection wells 14 radially spaced from the withdrawal wells as seen in FIG. 2. Withdrawal well 12 is formed by establishing a borehole 16 into the vadose layer 18 of contaminated earth above the water table (not shown) with the borehole terminating above the water table. Vadose zone 18 may be of varying stratigraphic compositions, but for illustrative purposes is shown as including two layers 17, 19 of permeable stratum below surface 30, with an intermediate impermeable layer 21 separating the two permeable layers. Loose pack fill 28, such as gravel is then poured into borehole 16 to a predetermined depth. Conduit, such as impermeable galvanized steel tubing 22 is positioned in borehole 16 spaced from the borehole outer wall just above fill material 28. Tubing 22 is open at its lower end 24 and at its upper end 26. Fluid permeable loose pack fill 28 is then backfilled into borehole 16 to a level just above tubing lower end 24 as determined by the individual site soil conditions. A quantity of impermeable fill 20 (such as bentonite or the like) is then packed about the remaining length of tubing 22 to the surface level 30, with the tubing upper end 26 extending slightly above the surface level.

Figure 1:
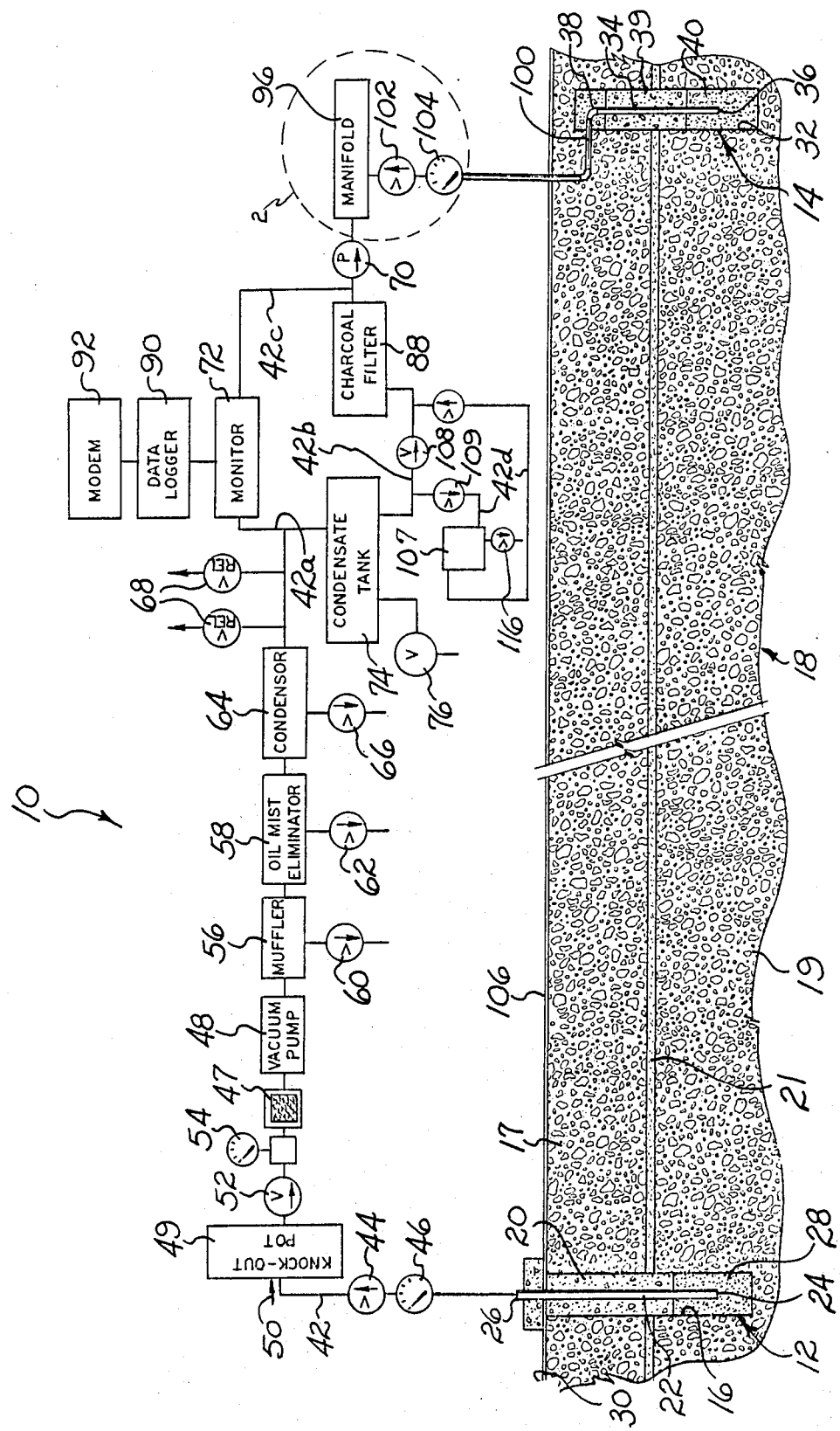
FIG. 1 is a schematic cross-sectional view of the contaminant recovery apparatus according to the principles of the invention with the wells terminating in the vadose layer of earth.
Figure 5:
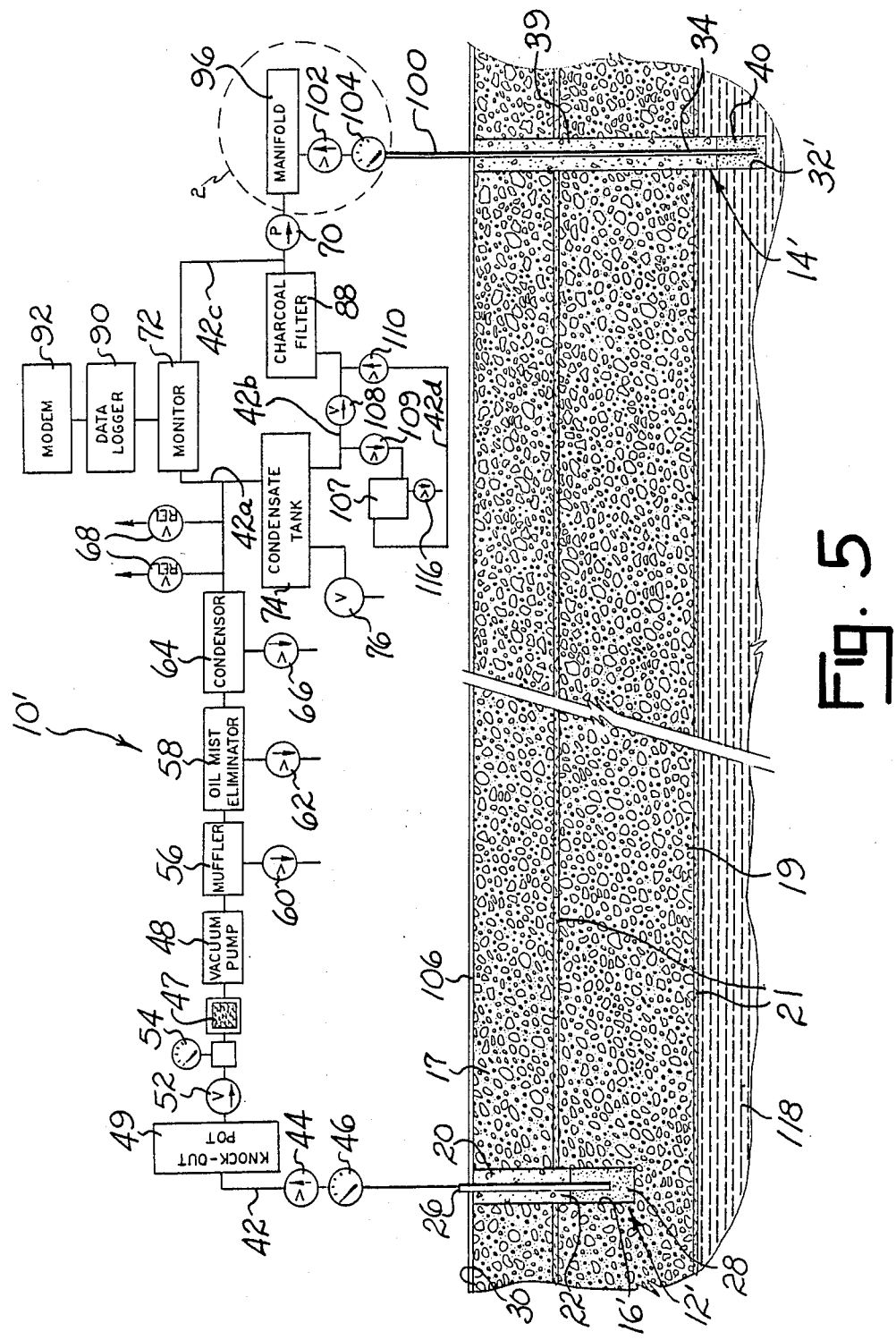
FIG. 5 is a schematic cross-sectional view of the apparatus of FIG. 1 showing the air injection wells terminating within the water table.

Each air injection well 14 is formed by establishing a borehole 32 in vadose layer 18 with the borehole terminating above the water table (not shown). Conduit, such as impermeable PVC tubing 34 is positioned in borehole 32 spaced from the borehole outer walls. Tubing 34 is open at its lower end 36 and at its upper end 38. A quantity of fluid permeable fill material such as loose pack gravel 40 is backfilled into borehole 32 to a level just above tubing lower end 36. A quantity of impermeable fill 39 (such as bentonite or concrete) is then packed about the remaining length of tubing 34 to surface level 30 as shown in FIGS. 1 and 5. Boreholes 16, 32 are shown as terminating in stratum layer 19, but it is understood that if contaminant is present in layer 17 that the boreholes may be drilled to allow contaminant withdrawal from this layer. Depth of wells 12, 14 will be dependent upon individual site stratigraphy and contaminant location and is not limited by this disclosure.

It is understood that multiple withdrawal wells 12 may be formed to treat large volumes of contaminated earth. Multiple withdrawal wells 12 may also be used in smaller areas where the subsurface stratum configuration requires. Such techniques as placing of wells 12 and 14, as well as the appropriate depths of boreholes 16 and 32 are well within the realm of those skilled in the art.

Conduit tubing 22 and 34 are preferably connected by a conduit 42 connected to the upper ends 26 and 38 of the respective tubing to form a closed loop circuit. Valves 44 may be positioned along conduit 42 adjacent tubing upper ends 26 and 38 to regulate air flow to and from conduits 22 and 34. Gauges 46 positioned adjacent valves 44 indicate the current air pressure level at the wellheads.

Along conduit 42 between tubing ends 26 and 38 may be connected a variety of testing and filtering devices which are shown in FIG. 1. It is understood that these devices are not all necessary to the practice of the invention and elimination of one or more of them may be had and still maintain the spirit of this invention. The first such device is a conventional knock-out pot 49 which acts to encourage condensation of liquid water and/or contaminant from the air stream to maximize system efficiency. After passing through knock-out pot 49, the air stream passes through a solid particle filter 47 which screens out solid particles drawn up through conduit tubings 22 and 42 and which prevents mechanical damage to the vacuum source. The air stream then passes through a vacuum source 48 which may be a vacuum pump (as shown), blower, exhaust fan or the like. Vacuum source 48 is oriented to drive the air stream in the direction indicated by arrows 50 of FIG. 1. Limit switches (not shown) may be included to shut down device 10 if conditions injurious to vacuum source 48 should occur. A valve 52 and gauge 54 may be positioned along conduit 42 to regulate and indicate air pressure at certain points along conduit 42.

After passing through vacuum source 48, the air stream may pass through exhaust muffler 56 and oil mist eliminator 58 which together act to capture any oil lost by the vacuum source, and also to collect water and/or contaminant for disposal through drain valves, respectively 60 and 62. The air stream may then pass through heat exchange condenser 64 which may be cooled by non-contact water to enhance vapor condensation for collection through drain valve 66. One or more vacuum relief valves 68 may be positioned along conduit 42 as shown to prevent excessive load on the air injection pump 70.

After passing through condenser 64, conduit 42 may be split into a high level contaminant monitor line 42a and a main flow contaminant line 42b. A quantitative monitor 72 is connected to and in fluid flow communication with high level contaminant line 42a and is utilized to measure contaminant vapor concentration within conduit 42. Limit switches (not shown) are connected to monitor 72 and serve to shut down device 10 if contaminant vapor concentration exceeds a predetermined value.

Figure 7:
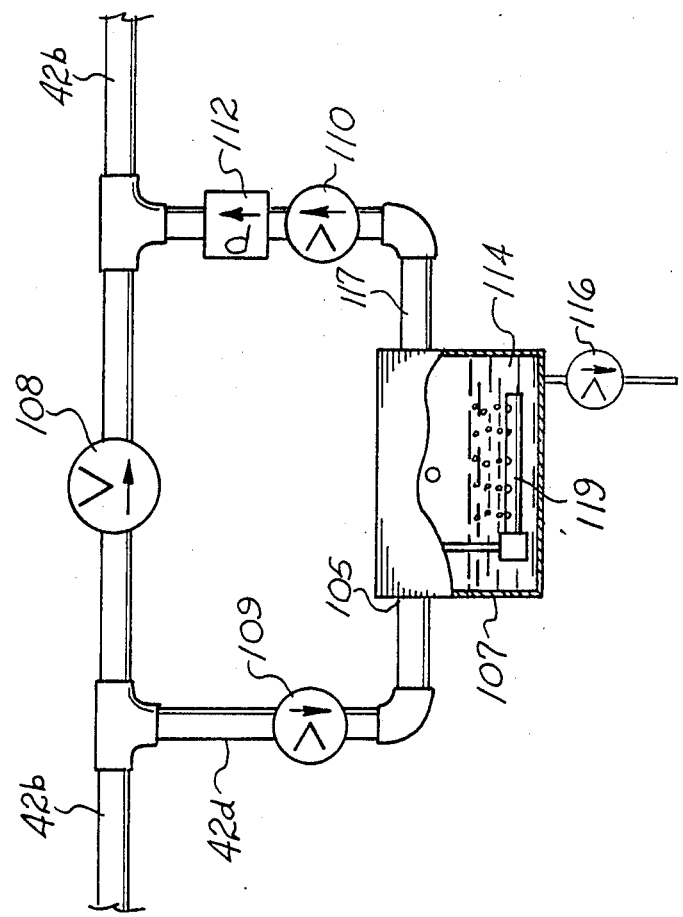
FIG. 7 is a detail view of the equilibration chamber seen within broken line 7 of FIG. 6.

Main flow contaminant line 42b may include an equilibration chamber 107 (shown in detail in FIG. 7) in flow communication therewith through the flow conduit line 42d. Three valves 108, 109, 110 regulate flow through conduit 42d. A vacuum pump 112 acts in concert with valves 108–110 to draw vapor through line 42d and chamber 107. Chamber 107 preferably includes an inlet pipe 105 and an outlet 117 and is filled with fluid 114 such as water. Chamber 107 may also include a drain valve 116. To utilize chamber 107, an operator opens valves 109–110 while closing valve 108 and drain valve 116 to allow the vapor flow from conduit 42b to pass into line 42d. The vapor enters chamber 107 through manifold pipe 119 which is below fluid 114. Any contaminant present in the vapor will begin to equilibrate with fluid 114 upon contact. When full equilibrium between fluid 114 and the vapor in chamber 107 is reached, valves 109–110 are closed, valve 108 is opened and pump 112 is deactivated. A sample may then be taken through drain valve 16, after which chamber 107 is removed, drained, and refilled with additional fluid 114 if more equilibration testing is required.

A condensate tank 74 is connected to and in fluid flow communication with main flow line 42b and may be equipped with a drain valve 76 for removal of condensate (oil, water and/or contaminant) and may include a limit switch to shut down device 10 if a preset limit is reached.

The air stream next passes into a neutralizing member 88 which is in flow communication with line 42b. Neutralizing member may be an activated carbon bed which captures contaminant by adsorption, alternatively it may be a source of heat, catalysts, or other treatment members which allow neutralization or capture of the contaminant. After treatment in member 88 the air stream passes into a contaminant sample line 42c connected to monitor 72 where it is analyzed for contaminant vapor concentration prior to delivery to air injection wells 14. Information concerning the contaminant is stored in a data logger 90 which may be accessed by a remote operator through telephone modem 92.

The air stream then passes through injection compression source 70 which is preferably a blower or pump in communication with conduit 42 and which increases the pressure and volume to air injection wells 14 while reducing back pressure on vacuum source 48. Injection source 70 delivers the compressed air stream to a manifold 96 for distribution to air injection wells 14. Manifold 96 is illustrated in FIG. 2 and includes a single inlet 98 and one or more outlets 100 which communicate with air injection wells 14 through tubing 34. Valves 102 and gauges 104 accurately measure and regulate source pressure at each manifold outlet 100. The entire ground surface 30 is preferably covered by a fluid impermeable cover 106 of impervious vinyl or similar material to prevent percolation of air, water and contaminant through the surface during recovery operations.

Device 10 is preferably operated as follows. With all components operatively connected, an operator switches on vacuum source 48 and air injection compression source 70. Vacuum source 48 creates an area of substantially reduced pressure in vadose layer 18 about withdrawal well 12 to cause contaminants contained therein to vaporize and be drawn into conduit tubing 22, and through conduit 42 where the contaminant is eventually captured or neutralized by member 88. Any residual air drawn into the system is then charged from conduit 42 back into vadose layer 18 through air injection wells 14 under pressure by compression source 70 to encourage migration of additional contaminants in the vadose layer to move toward withdrawal well 12 where they may be vaporized and collected for neutralization or capture. A continuous closed-loop process is the result.

It should be noted that site stratigraphy will normally dictate the depths and configurations of withdrawal wells 12 and air injection wells 14. Several modifications of the device 10 may be possible depending upon site conditions and regulatory agency requirements. Two such modifications are shown in FIGS. 5 depicts an apparatus 10' in which air injection wells 14' are placed within the aquifer or water table 118. In this embodiment, air withdrawal wells 12' terminate in vadose zone 18 above water table 118. Clean air is injected through wells 14' into water table 118 creating bubbles and streams of air which rise through the water and around the soil particles. As the bubbles rise into vadose zone 18 they come into contact with liquid or vapor phase VOC's, which vaporize into the air bubbles and are carried to withdrawal wells 16' for removal.

Figure 6:
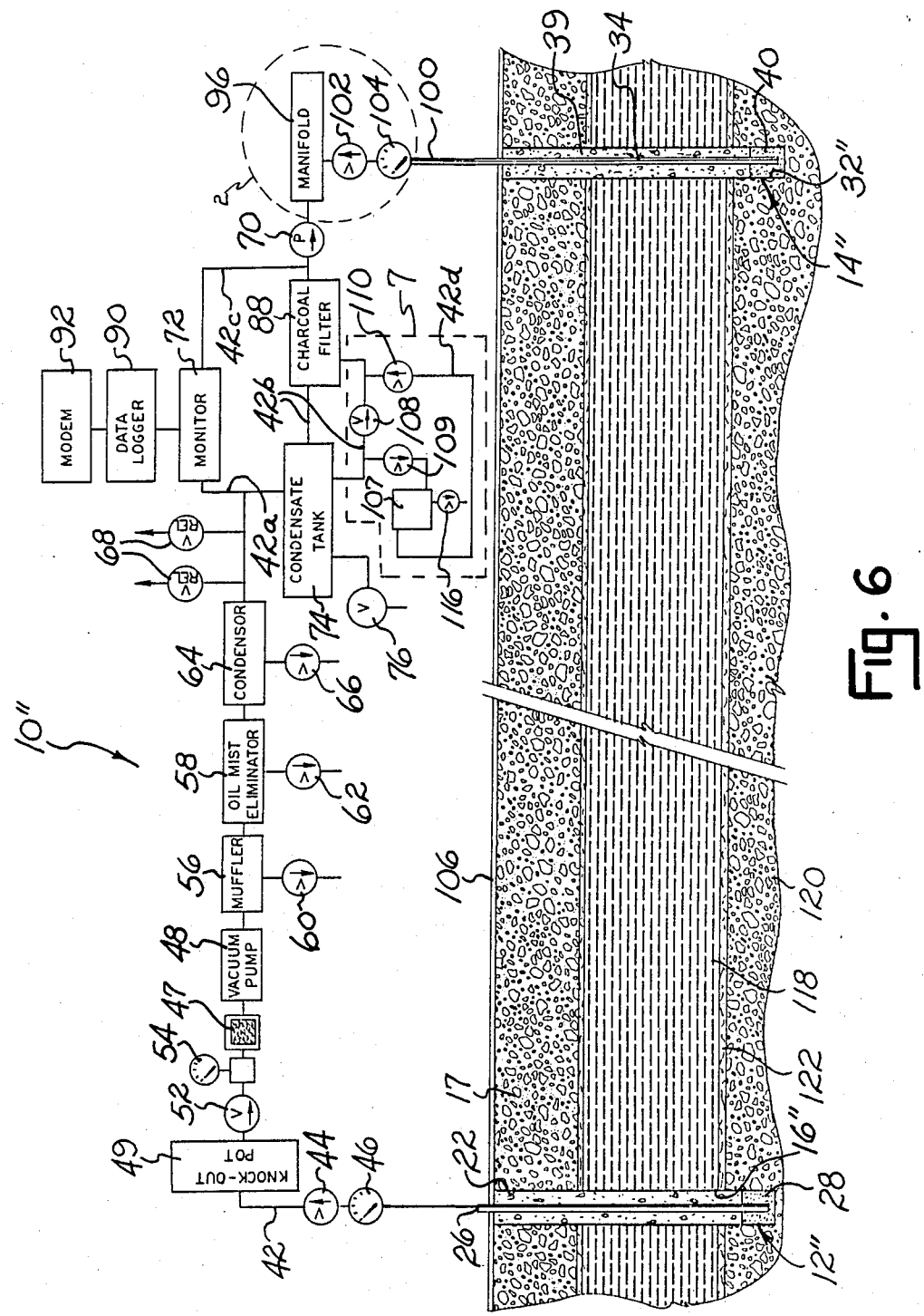
FIG. 6 is a schematic cross-sectional view of the apparatus of FIG. 1 showing contaminant recovery from below the water table.

FIG. 6 depicts apparatus 10" in which air withdrawal wells 12" and air injection wells 14" terminate in a layer of high air of permeable stratum 120 below water table 118 and separated by a layer of air impermeable or low permeability stratum 122. At the beginning, all wells 12", 14" are operated as air injection wells until a large air bubble is formed and detected at the normal air injection well 14". This air bubble forces water from the high permeability stratum 120 to create a sort of artificial vadose zone. Wells 12" and 14" are then operated as above described with the relative air volume injected and withdrawn monitored to maintain the dewatered condition within stratum layer 120.

The scope of the invention is not to be considered limited by the above disclosure, and modifications are possible without departing from the spirit of the invention as evidenced by the following claims.

We claim:

1. A method of recovering and controlling a volatile contaminant from a contaminated layer of earth above a water table comprising the steps of:
    establishing a first borehole in said earth, said first borehole terminating in said contaminated layer;
    establishing a second borehole spaced from said first borehole in said earth and which terminates within said water table below said contaminated layer;
    positioning a first conduit in said first borehole, with said first conduit being of smaller diameter than said first borehole;
    positioning a second conduit in said second borehole, with said second conduit being of smaller diameter than said second borehole;
    packing a fill material about each first and second conduit in their respective boreholes;
    operatively connecting said first and second conduits by a third conduit wherein said first conduit is in fluid flow communication with said second conduit;
    positioning means for neutralizing said volatile contaminant along said third conduit in flow communication therewith;
    positioning means for drawing air from said contaminated earth in flow communication with said first and second conduits;
    activating said means for drawing wherein air is drawn out of said contaminated layer to create an area of substantially reduced pressure which causes substantial quantities of said volatile contaminant to vaporize and be drawn up through said first conduit into said means for neutralizing to produce clean air;
    positioning a pump means between said means for neutralizing and said second conduit in flow communication therewith wherein said clean air is passed from said means for neutralizing into said second conduit.

2. The method of claim 1 wherein said first and second conduits are formed of impermeable tubing having an upper opening and a lower opening, said third conduit is formed of impermeable tubing having first and second end openings, each first and second conduit upper opening in flow communication with said third conduit through one of said third conduit first and second openings.

3. The method of claim 1 wherein a portion of said fill material is formed of a fluid permeable substance packed in each borehole to a level just above each conduit lower opening, with a remaining portion of said fill material formed of a generally fluid impermeable substance.

4. Apparatus for recovery and neutralization of volatile contaminants from a layer of contaminated earth located above a water table, said apparatus comprising a first conduit positioned within a first borehole terminating in said contaminated layer, a second conduit positioned within a second borehole spaced from said first borehole and terminating within said water table below said contaminated layer, said first conduit operatively connected to and in flow communication with said second conduit by a third conduit, means positioned along one of said conduits for drawing air from said contaminated layer to produce a substantial area of reduced pressure in said first conduit wherein said volatile contaminant is vaporized and drawn from the ground, and means for neutralizing said volatile contaminant positioned in flow communication with said first conduit to produce a purified fluid, and pump means for passing said purified fluid from said means for neutralizing into said second conduit and back into said contaminated layer.

5. Apparatus of claim 4 and means positioned along and in flow communication with said third conduit for effecting condensation of said volatile contaminant after drawing up through said first conduit prior to the entry of the contaminant into said means for neutralizing.

6. Apparatus of claim 4 wherein said first borehole is a vacuum withdrawal well, and said second borehole is an air injection well and includes a plurality of said second boreholes radially spaced about said vacuum withdrawal well to form a recovery area whereby passing said purified fluid through said air injection wells urges said contaminant present in said recovery area towards said vacuum withdrawal well.

7. Apparatus of claim 6 wherein said third conduit includes a manifold means for selectively passing said purified fluid from said controlling means to one or more of said air injection wells.

8. Apparatus of claim 6 wherein said second borehole terminates in a below ground aquifer wherein bubbles and streams of air are formed upon injection of air into the second conduit, said bubbles and streams of air carrying said volatile contaminant towards said contaminant withdrawal well under the influence of said air forced through said second conduit.

9. Apparatus of claim 4 and an equilibration means which includes an equilibration chamber filled with a liquid connected to a fourth conduit in flow communication with said third conduit, and a pump means associated with said equilibration and fourth conduit for drawing said air and volatile contaminant from said third conduit into the fourth conduit and equilibration chamber.

10. Apparatus of claim 4 wherein said first and second boreholes terminate in a vadose zone of said contaminated earth.

11. A method of recovering and controlling a volatile contaminant from a contaminated layer of earth existing below a water table in a high air permeability stratum separated from said water table by a low air permeability stratum comprising the steps of:
establishing a first borehole in said earth, said first borehole terminating in said contaminated layer;
establishing a second borehole spaced from said first borehole in said earth in which terminates in said contaminated layer;
positioning a first conduit in said first borehole with the first conduit being of smaller diameter than said first borehole;
positioning a second conduit in said second borehole, with said second conduit being of smaller diameter than said second borehole;
packing fill material about each first and second conduit in their respective boreholes;
positioning means for drawing air from said contaminated earth in flow communication with said first conduit;
positioning means for injecting air in flow communication with said second conduit;
activating said means for injecting wherein air is injected into said contaminated air to form an air bubble to force water out of the contaminated layer;
activating said means for drawing wherein air is drawn out of said contaminated layer to create an area of substantially reduced pressure which causes substantial quantities of said volatile contaminant to vaporize and be drawn up through said first conduit whereby said contaminated layer is purified.

* * * * *